United States Patent [19]

Ponder

[11] 4,415,762

[45] Nov. 15, 1983

[54] FLEXIBLE GAS-INSULATED ELECTRICAL CABLE HAVING NON-METALLIC FLEXIBLE INSERTS BETWEEN CENTRAL CONDUCTOR AND SUPPORT INSULATORS

[75] Inventor: Jonathan Z. Ponder, Hatfield, Pa.

[73] Assignee: Electric Power Research Institute, Palo Alto, Calif.

[21] Appl. No.: 202,570

[22] Filed: Oct. 31, 1980

[51] Int. Cl.³ .......................... H01B 9/04; H02G 5/06
[52] U.S. Cl. ..................................... 174/28; 174/99 B
[58] Field of Search ..................... 174/16 B, 28, 99 R, 174/99 B, 111, 154, 155, 156, 167; 24/262; 138/114; 333/244

[56] References Cited

U.S. PATENT DOCUMENTS 3,996,414 12/1976 Artbauer et al. ..................... 174/28
4,095,041 6/1978 Netzel et al. .......................... 174/28
4,100,367 7/1978 Netzel .................................... 174/28
4,101,730 7/1978 Netzel ............................... 174/21 C
4,122,298 10/1978 Brandt ................................... 174/28
4,263,476 4/1981 Netzel ................................... 174/156

Primary Examiner—Laramie E. Askin
Attorney, Agent, or Firm—Ostrolenk, Faber, Gerb & Soffen

[57] ABSTRACT

A soft silicone rubber insert is compressed between the interior surface of an insulator support in a gas-insulated cable and the outer surface of a soft aluminum central conductor which is supported within the interior surface of an opening in the insulator. The flexible rubber insert prevents scratching of the surface of the aluminum conductor and the production of aluminum particles during relative movement between the insulator and the aluminum tube.

5 Claims, 5 Drawing Figures

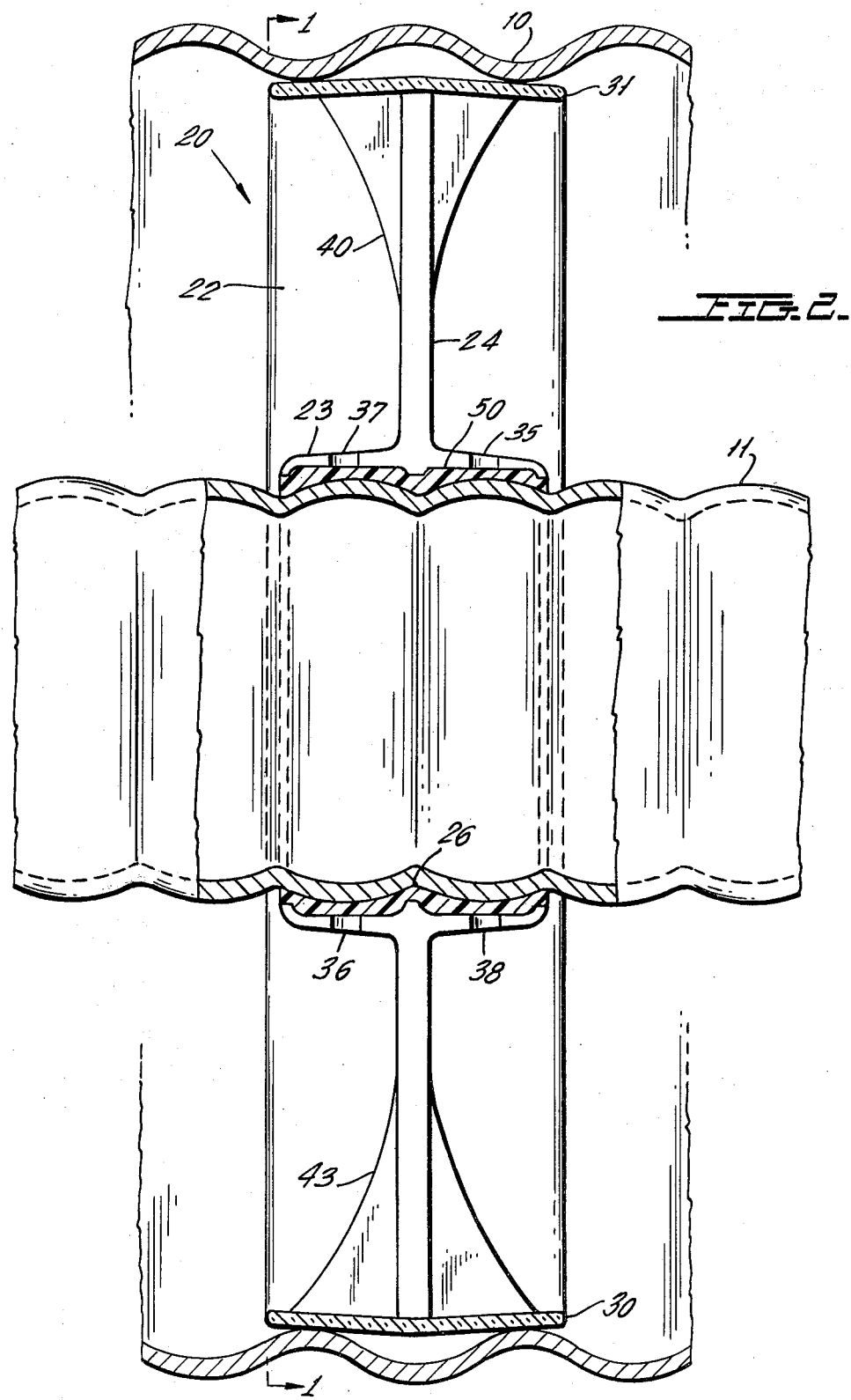

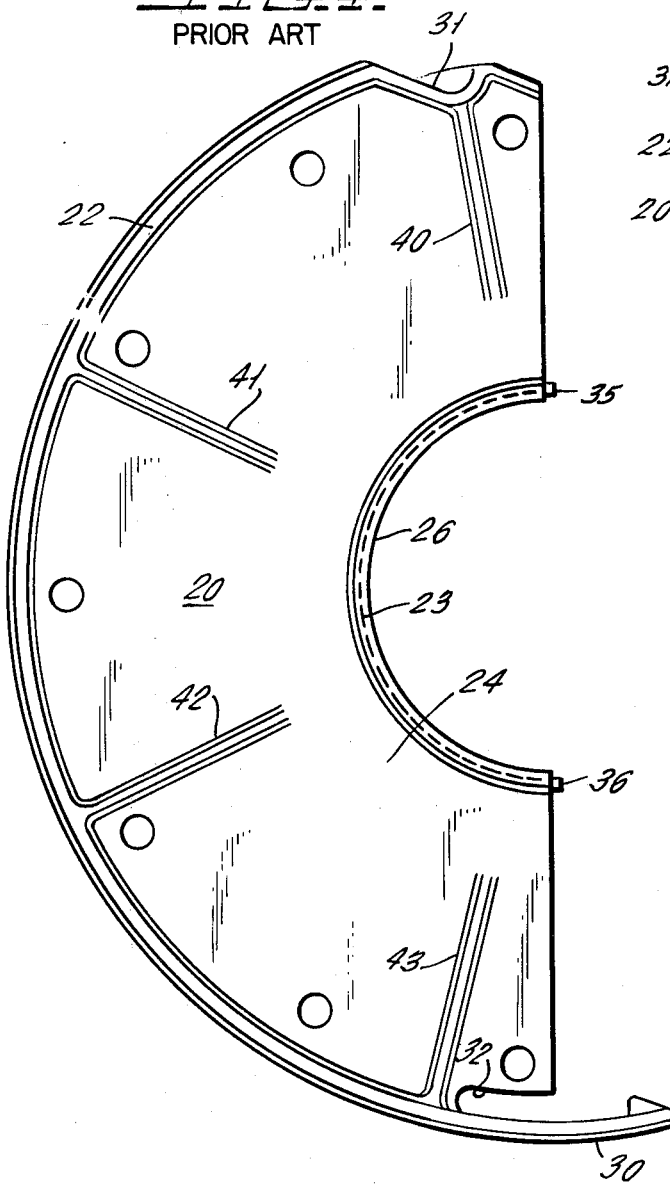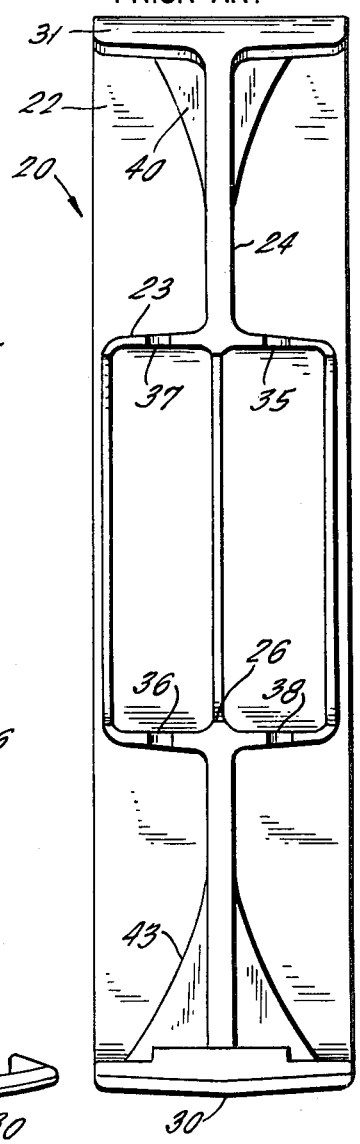
FIG. 4. PRIOR ART
FIG. 5. PRIOR ART

FLEXIBLE GAS-INSULATED ELECTRICAL CABLE HAVING NON-METALLIC FLEXIBLE INSERTS BETWEEN CENTRAL CONDUCTOR AND SUPPORT INSULATORS

BACKGROUND OF THE INVENTION

This invention relates to flexible high voltage gas-insulated cable, and more specifically relates to a novel soft insert pad disposed between a support insulator and the conductor supported thereby within the interior of the cable to prevent the generation of conductive particles within the housing of the cable.

Flexible gas-insulated cable structures for transmission and distribution of electric power at high voltage are well known and commonly consist of a central conductor supported within an outer housing which is filled with a dielectric gas such as sulfur hexafluoride under positive pressure. Both the outer housing and central conductor are corrugated or are otherwise made flexible to enable the reeling of the cable so that it can be shipped by truck or railroad car, and to enable the installation of the cable in an irregular terrain or ditch such that the cable will conform to the contours of the location in which it is installed.

The central conductor of the cable is frequently aluminum and the support insulators which support the central conductor within the outer sheath are usually a molded thermoplastic material such as an acrylic Plexiglass DR61K.

A preferred aluminum alloy, which is used for cable of this type, is a relatively soft high conductivity aluminum such as a 1100 aluminum alloy. The material of the support insulators is harder than the relatively soft aluminum so that during the manufacturing process and during the process of bending or reeling the assembled cable when there are axial stresses and possible movement between the central aluminum conductor and the plastic housing insulator, it is possible for the plastic insulator to gouge or abrade the outer surface of the soft aluminum, producing scractches on the aluminum surface and small chips of aluminum.

During operation, the aluminum particles, which are in an exceptionally high electric field since the small diameter cable might have a rated 330 kV or higher between the central conductor and outer housing, can cause breakdown of the dielectric gas and failure of the cable. Similarly, scratches in the aluminum surface can lead to corona discharge and ultimate failure of the cable.

Cables of the general type disclosed above are shown in numerous issued U.S. patents including U.S. Pat. No. 4,100,367 in the name of Netzel, U.S. Pat. No. 4,095,041 in the names of Netzel and Ponder, U.S. Pat. No. 4,101,730 in the name of Netzel, U.S. Pat. No. 4,122,298 in the name of Brandt.

BRIEF DESCRIPTION OF THE INVENTION

While the production of metallic particles in high voltage cable and other high voltage apparatus is a known problem, the source of the particles is not always known. It has now been recognized that particles are produced when using a desirably soft aluminum central conductor with a harder support insulating body which can produce the gouging referred to above and thus the production of aluminum chips and irregularities in the surface of the central conductor.

In accordance with the invention and following the recognition of this problem, a novel intermediate pad is formed between the interior of the support surface of the insulator and the exterior of the aluminum conductor to prevent rubbing between the two and the gouging of the aluminim surface. This pad can take the shape of a molded pad or can be produced in any other desired manner and consist of a resilient material such as silicone rubber. The pad may be put in place before or during the assembly of the cable, wherein a mult-section insulator disk is clamped around the central conductor to firmly press the pad between the central conductor and the interior surface of the insulator.

A wide variety of materials has been successful for the pad. The principal characteristic of the pad material is that it meets the temperature requirements of the cable and will retain its resiliency over a long period of time. For example, the material selected should withstand temperatures of 150° C. over an extended period of time. Silicone rubber satisfies these requirements.

The novel pad of the invention will also improve the mechanical strength and electrical properties of the insulator. Thus, the silicone rubber will fill the space between the insulator and conductor to improve its dielectric properties by reducing the electric field stress at the insulator conductor interface and by eliminating the abrasion and subsequent particle generation caused by rubbing contact between the insulator and conductor. Moreover, the pad improves the mechanical strength of the insulator by spreading the loading force over a wider area. Not only does the resiliency of the pad reduce mechanical load concentration at the insulator interior, but it also improves mechancial shock withstand capability of the insulator.

The novel insulator pad of the invention can take the form of a molded pad which is molded into the interior of the insulator during the manufacture of the insulator halves. Alternatively, the pad can take the form of a sheet of rubber laid between the insulator and conductor during their assembly. Sheets of both silicone rubber and Teflon have been found to perform as well as a molded pad, even though the space between the conductor and insulator is not completely filled by the sheet material. When using sheet material, it can be bonded either to the insulator or conductor, or simply held in place between the insulator and conductor without bonding. The sheet seam can be either butt-joined or lap-joined and both have worked successfully.

The novel resilient pad can also take the form of a self-fusing silicone rubber tape which is wrapped around the conductor and fused into a solid mass of silicone rubber surrounding the conductor. The insulator is then assembled onto the conductor over the section covered by the self-fusing tape.

It is noted that insulation sheaths have been used in the past between a central conductor and its support insulator for rigid cable. The insulation sheath covers the entire surface of the rigid central conductor and was intended to immobilize conductive particles and control the electric field which causes movement of conductive particles. The problem of gouging a soft conductor by a hard insulator, however, does not exist because the assembly was not flexible.

The invention can also be carried out by the use of a silcone rubber coating applied to the insulator core which is allowed to cure prior to insulator assembly.

BRIEF DESCRIPTION OF THE DRAWINGS

FIG. 2 is a cross-sectional view of FIG. 1 taken across the section line 2-2 in FIG. 1 and shows the pad of the invention.

FIG. 4 is a front elevation view of one insulator half of the insulator of FIG. 3.

FIG. 5 is an elevation view of the diametrical edge of the insulator half of FIG. 4.

DETAILED DESCRIPTION OF THE DRAWINGS

Figure 1:
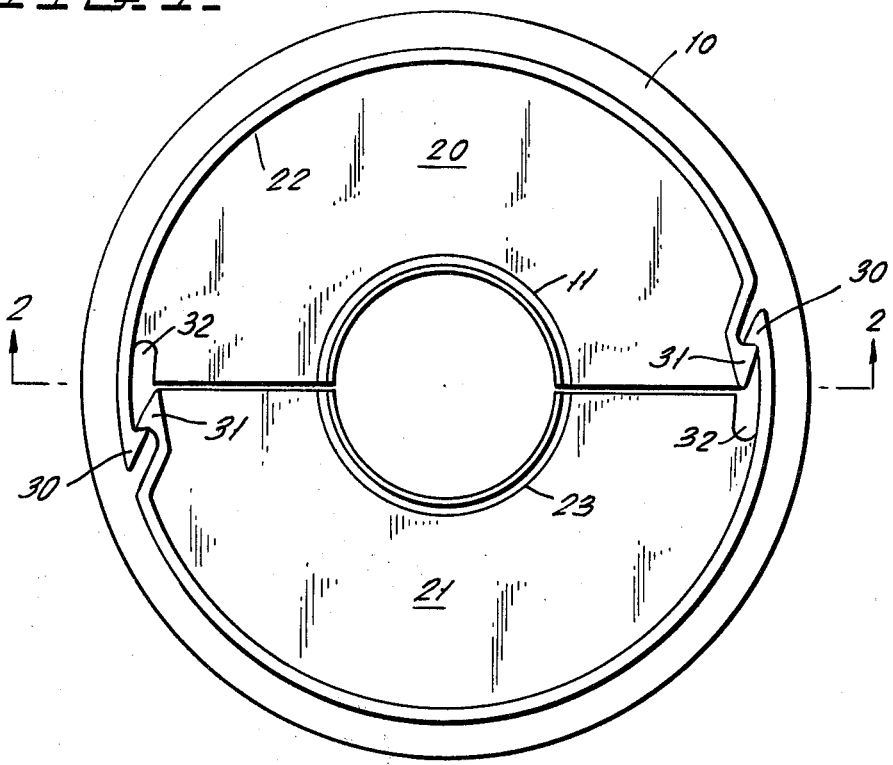
FIG. 1 is a cross-sectional view taken perpendicularly to the axis of a flexible cable and shows an insulator clamped in place over a central conductor and supporting the central conductor relative to an outer corrugated aluminum sheath.

Referring first to FIGS. 1 and 2, there is illustrated therein a flexible gas-insulating cable which incorporates the novel resilient pad of the present invention (FIG. 2) as will be later described. The gas-insulated cable may be of the general type described in any of the patents listed above.

The insulator support is of the type shown in copending application Serial No. 82,130, filed Oct. 5, 1979, in the name of Philip C. Netzel, now U.S. Pat. No. 4,263,476.

In FIGS. 1 and 2, the gas-insulated cable consists of an outer corrugated aluminum sheath 10 which is filled with sulfer hexafluoride gas under a positive pressure, for example, 45 p.s.i.g. A plurality of support insulators are spaced along the length of the cable in order to centrally support a central conductor 11 within the aluminum sheath 10. Conductor 11 is corrugated as is aluminum sheath 10 to improve its flexibility. Conductor 11 is preferably made of a 1100 aluminum alloy which is a relatively soft and flexible aluminum alloy.

FIGS. 1 and 2 show the central conductor 11 as a single corrugated tube. However, the central conductor 11 can take any desired form and can consist of a plurality of concentric tubes arranged in the manner disclosed in copending application Ser. No. 202,452, filed Oct. 31, 1980, in the name of Philip C. Netzel and Edward M. Spencer, entitled MULTIPLE WALL STRUCTURE FOR FLEXIBLE CABLE USING TUBULAR AND SPIRAL CORRUGATIONS, which is assigned to the assignee of the present invention.

Regardless of the number of tubes used or structure used for the central conductor 11, it is only significant that the outer tube 11, whose surface will be gripped by support insulators spaced along the axis of the cable, is of a relatively soft conductive material in comparison to the hardness of the support insulator.

Figure 3:
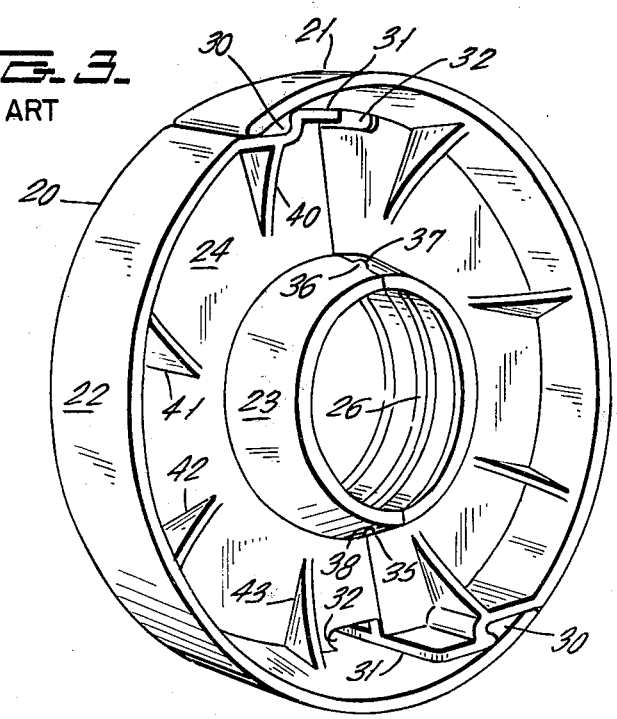
FIG. 3 is a perspective view of a preferred prior art support insulator which can be used in connection with the invention.

Before describing the novel resilient pad of the invention, it is necessary first to understand the detailed structure of the support insulator. The support insulator structure is best shown in FIGS. 3, 4 and 5 and is the structure disclosed in U.S. Pat. No. 4,263,476.

The insulator in FIGS. 3, 4 and 5 is made in two halves which are latched together over the central conductor they support, as will be later described, and may be made of any suitable plastic material, for example, in an injection-molding process. The resulting product has a hardness greater than that of 1100 alloy aluminum used for conductor 11.

The insulator can be used with flexible gas-insulated cable for a high voltage transmission system having a relatively low frequency, for example, 60 Hertz, at high voltage, for example, 345,000 volts. The insulator outer diameter typically may be 336 millimeters and may support a central bus or conductor 11 having an outer diameter which typically may be about 120 millimeters in diameter. The insulator permits the bending of the cable to a radius having a ratio of reel diameter to cable diameter of about 9 to 1. Thus the cable can be wound to a small diameter and requires a small shipping reel for shipping the cable.

The insulator structure generally consists of the two halves 20 and 21. Note that half 21 may have an opening therein (not shown) to permit passage of gas through the interior of the housing of the completed cable. Halves 20 and 21 are otherwise identical and the same identifying numerals used hereinafter will identify similar parts.

Each of the halves is molded from a suitable plastic as a unitary part. They each consist of an outer rim 22, an inner rim 23 and a central connecting web 24. The inner rim 23 is also shaped for maximum dielectric efficiency and contains a central projection 26 which is shaped to fit the cooperating corrugation of the central conductor 11 to be supported by the insulator.

The central web 24 is preferably as thin as possible to present as small as possible a cross-section to the high electric field which will exist between a conductor on the interior of the rim 23 and the grounded conductive housing surrounding the exterior of the rim 22.

In order to join together the two halves 20 and 21, each of the halves is provided with integral cooperating latch members shown as the projecting latch 30 and a respective latch keeper region 31. During assembly, the latch 30 of one half will snap into the latch keeper 31 of the other half, as shown in FIG. 3. Note that the latch member 30 is made relatively flexible by cutting a notch 32 into the web 24 adjacent the latch 30. The keeper 31, however, is rigid.

Each of the halves 20 and 21 is further provided with keying projections and notches which cooperate with one another to hold the halves fixed relative to one another after they are assembled. Thus, the half 20 of FIG. 5 is provided with key projections 35 and 36 and key depressions 37 and 38. The key projections and key depressions 35 through 38 of adjacent insulator halves are automatically aligned with one another during the assembly of the two halves.

Four reinforcing ribs 40 to 43 are provided for each insulator half. Each of the ribs 40 to 43 is identically shaped and tapers outwardly from the central web beginning at a point about one-third of the radial distance along the web from the central rim 23 and the ribs then taper or flare outwardly to join the outer rim 22. The outward flare is a relatively gentle flare and, for example, is on a radius of about 113 millimeters.

Two reinforcing ribs 40 and 43 are preferably located immediately adjacent the keeper 31 and just behind the latch 30, respectively. It has been found that this placement of the ribs prevents breakage at these points which is the most frequent point of failure in insulators of the type to which the invention applies.

The ribs taper over a distance of about two-thirds of the radial dimension of the web 24 and begin to taper outwardly only one-third of the radial dimension of the web away from the central conductor. The high dielectric stress adjacent to the central conductor is then on regions of the web 24 which have minimum thickness. Thus, the provision of the reinforcing ribs 40 through 43 does not cause undue dielectric stress within the insulator. The placement of the ribs in the latch and keeper areas 30 and 31, respectively, as pointed out previously, eliminates breakage at these points when insulators are tested for failure under radial loading.

In accordance with the invention and as shown in FIG. 2, a self-supporting pre-molded pad of silicone rubber 50 is fixed to the interior surface of the insulator or to the exterior of the conductor 11, where the insulator is to clamp onto the outer surface of conductor 11. This pad may have a thickness, for example, of ⅛ inch and is compressed between the interior surface of the central opening formed between the insulator halves and the exterior surface of the aluminum tube 11 during their assembly.

As a result of this pad, whenever there is relative axial movement between any of the insulators and the tube 11, as may occur due to relatively axial stresses during reeling and during assembly or during any flexure of the cable after installation, there will be no gouging of the relatively soft surface of aluminum tube 11 by the relatively harder interior of the insulator support.

The molded pad 50 has the shape of a short cylinder and can be formed of two separate halves which are individually fixed to the two halves 20 and 21 of the insulator. Other materials than silicone rubber can be used and, for example, Teflon has been found to serve an adequate function as a pad to prevent abrasion of the outer aluminum surface of conductor 11 by the harder insulation support.

The relatively soft pad 50 distributes loading forces between the conductor 11 and support insulator halves 20 and 21 over a wider area and thus improves the mechanical connection of the two components with respect to mechanical load concentration and mechanical shock withstand capability.

The flexible pad 50 can take forms other than a pre-molded form. By way of example, pad 50 can take the form of a sheet of silicone rubber wrapped on the conductor or wrapped within the insulator. When wrapped on the conductor, the ends of the sheet can be either butt-joined or lap-joined and both methods have worked satisfactorily.

Experiments have been carried out using a self-fusing silicone rubber tape which is wrapped around the conductor 11 before installation of the insulator halves 20 and 21. This tape is wrapped and fuses into a solid mass of silicone rubber which is then compressed during the assembly of the insulator halves over the silicone rubber covered sections of conductor 11.

Other methods may be employed to connect a resilient pad between the opposing surfaces of conductor 11 and insulator halves 20 and 21 which will be well apparent to those skilled in the art.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. A high voltage flexible cable comprising an elongated outer conductive housing, a central conductor having a corrugated outer conductor member, said central conductor extending coextensively with said outer housing, a plurality of support insulators spaced along the axis of said cable each having a central opening receiving and supporting said central conductor within said outer housing; a dielectric gas under positive pressure filling the interior of said outer housing; each of said support insulators formed of an injection-molded plastic insulation material which is harder than the exterior surface of the corrugated outer conductor member of said central conductor; said exterior surface of the corrugated outer conductor member of said central conductor being axially movable relative to said interior surfaces of said support insulators due to bending forces applied to said cable; wherein the improvement comprises a plurality of flexible material pads consisting of a silicone rubber, an individual one of said pads being compressed between the interior surface of the central opening of each support insulator and said exterior surface of the corrugated outer conductor member of said central conductor to prevent scratching of said exterior surface of the corrugated outer conductor member of said central conductor by said interior surfaces of said support insulators due to relative axial motion between said central conductor and said support insulators.

2. The cable of claim 1 wherein each of said support insulators consists of a plurality of identical sections which are clamped together over the exterior surface of said corrugated outer conductor member of said central conductor.

3. The cable of claim 1 wherein said corrugated outer conductor member of said central conductor consists of 1100 alloy aluminum.

4. The cable of claim 1 wherein each of said pads consists of a pre-molded form secured either to the interior surface of the central opening of one of said support insulators or to said exterior surface of said corrugated outer conductor member of said central conductor.

5. The cable of claim 1 wherein each of said pads consists of a sheet of material wrapped around said exterior surface of said corrugated outer conductor member of said central conductor.

* * * * *